(12) United States Patent
Giametta et al.

(10) Patent No.: US 9,938,835 B2
(45) Date of Patent: Apr. 10, 2018

(54) METHOD AND SYSTEMS FOR PROVIDING COOLING FOR A TURBINE ASSEMBLY

(71) Applicant: General Electric Company, Schenectady, NY (US)

(72) Inventors: Andrew Paul Giametta, Greenville, SC (US); David Richard Johns, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1197 days.

(21) Appl. No.: 14/068,776

(22) Filed: Oct. 31, 2013

(65) Prior Publication Data
US 2015/0118045 A1 Apr. 30, 2015

(51) Int. Cl.
  F01D 5/18 (2006.01)
  F01D 5/08 (2006.01)
  F01D 5/30 (2006.01)
(52) U.S. Cl.
  CPC ............... *F01D 5/18* (2013.01); *F01D 5/081* (2013.01); *F01D 5/187* (2013.01); *F01D 5/3007* (2013.01); *Y02T 50/676* (2013.01)
(58) Field of Classification Search
  CPC ........ F01D 5/187; F01D 5/3007; F01D 5/082; F01D 5/081; F01D 5/18
  See application file for complete search history.

(56) References Cited

U.S. PATENT DOCUMENTS

| 5,388,962 A | 2/1995 | Wygle et al. |
| 5,630,703 A | 5/1997 | Hendley et al. |
| 7,309,212 B2 | 12/2007 | Itzel et al. |
| 2004/0191067 A1* | 9/2004 | Phipps ............... F01D 5/082 416/219 R |

* cited by examiner

Primary Examiner — Dwayne J White
Assistant Examiner — Justin A Pruitt
(74) Attorney, Agent, or Firm — Armstrong Teasdale LLP

(57) ABSTRACT

A system for providing cooling of a turbine rotor wheel includes a rotor wheel including a plurality of dovetail slots spaced circumferentially about a peripheral surface of the rotor wheel. Each of the dovetail slots includes a pair of opposite upper slot tangs and a pair of opposite lower slot tangs. The system also includes at least one turbine blade. The turbine blade includes an airfoil, a platform, and a dovetail. The dovetail includes a pair of opposite upper dovetail tangs and a pair of opposite lower dovetail tangs. The dovetail further includes at least one inlet aperture extending longitudinally therethrough. The pair of upper dovetail tangs include a first cooling hole extending therethrough and coupled in flow communication with the at least one inlet aperture.

20 Claims, 6 Drawing Sheets

METHOD AND SYSTEMS FOR PROVIDING COOLING FOR A TURBINE ASSEMBLY

BACKGROUND

The field of the present disclosure relates generally to gas turbine engines and more specifically, to methods and systems for cooling gas turbine engine rotor assemblies.

At least some known gas turbine engines include a rotor assembly including circumferentially-spaced turbine blades. Each turbine blade, sometimes referred to as a bucket, includes an airfoil that extends radially outward from a platform. Each turbine blade also includes a dovetail that extends radially inward from a shank that extends between the platform and the dovetail. The dovetail is used to mount the turbine blade within the rotor assembly to a rotor wheel. The rotor wheel includes a plurality of circumferentially alternating dovetail slots and posts spread about the periphery of the rotor wheel. Each post is defined between adjacent dovetail slots. At least some known blades include internal cooling passages defined by the airfoil, platform, shank, and dovetail. In such blades, cooling fluid is supplied to the passages from a source of cooling fluid, such as compressor discharge air, coupled to the turbine blade.

At least some known turbine gas engines use a seal body that is typically positioned over the top of each rotor wheel post in a cavity bounded by the top of the post, the shank portions of adjacent blades and the underside of the platforms of adjacent blades. The seal body includes a forward cover plate that forms a cavity on the forward side of the rotor wheel. The temperature of the air within the forward cavity is generally hotter than the cooling air entering the dovetail portion of the blades due to leakage of hot gases from the primary gas stream into the forward cavity. As such, the forward cavity is typically purged with the cooling fluid. Thermal isolation of the top of the rotor wheel post ensures that the temperature of the rotor wheel post does not exceed allowable limits. The cover plates facilitate cooling of the rotor wheel, but the benefits of such cover plates may be outweighed by the requirement of additional space for the plates and the need for additional hardware components, which can increase the cost and decrease the performance of the gas turbine engine.

Accordingly, it would be desirable to improve rotor wheel cooling by channeling cooling air directly to the surface of the rotor wheel tangs, by reducing the number of hardware components needed, and by reducing the space requirements of the cooling system.

BRIEF DESCRIPTION

In one aspect, a system for cooling a rotor wheel assembly is provided. The cooling system includes a rotor wheel including a plurality of dovetail slots spaced circumferentially about a peripheral surface of the rotor wheel. Each of the dovetail slots includes a pair of opposite upper slot tangs and a pair of opposite lower slot tangs. The cooling system also includes at least one turbine blade including an airfoil, a platform, and a dovetail. The dovetail includes a pair of opposite upper dovetail tangs and a pair of opposite lower dovetail tangs. The dovetail further includes at least one inlet aperture extending longitudinally therethrough. The pair of upper dovetail tangs include a first cooling hole extending therethrough and coupled in flow communication with the at least one inlet aperture.

In another aspect, a turbine engine is provided. The turbine engine includes a rotatable shaft having an axis of rotation. The turbine engine also includes a casing extending circumferentially about the rotatable shaft, the casing including at least one conduit configured to channel a cooling fluid. The turbine engine further includes a rotor wheel assembly coupled to a portion of the rotatable shaft for rotation therewith. The rotor wheel assembly is configured to expand a working fluid of the turbine engine. The rotor wheel assembly includes a rotor wheel including a plurality of dovetail slots spaced circumferentially about a periphery of the rotor wheel. Each of the dovetail slots includes a pair of opposite upper slot tangs and a pair of opposite lower slot tangs. The rotor wheel assembly also includes a plurality of turbine blades arranged in a circumferential array about the axis of rotation. Each respective turbine blade of the plurality of turbine blades includes an airfoil, a platform, and a dovetail. The dovetail includes a pair of opposite upper dovetail tangs and a pair of opposite lower dovetail tangs. The dovetail further includes at least one inlet aperture extending longitudinally therethrough and coupled to the casing conduit. The pair of upper dovetail tangs includes a first cooling hole extending therethrough and coupled in flow communication with the at least one inlet aperture.

In still another aspect, a method of cooling a rotor wheel rim of a rotor wheel assembly is the provided. The rotor wheel assembly includes a plurality of turbine blades and a rotor wheel including a plurality of dovetails slots spaced circumferentially about a periphery of the rotor wheel, wherein each turbine blade of the plurality of turbine blades includes an airfoil having at least one cooling passage, a platform, and a dovetail having at least one inlet aperture coupled in flow communication with the at least one cooling passage. The method includes forming a first cooling hole through an upper tang of the turbine blade dovetail in flow communication with the at least one inlet aperture. The method also includes forming a cavity between a lower surface of the upper tang of the turbine blade dovetail and an upper surface of a corresponding dovetail slot lower tang. Furthermore, the method includes directing a cooling fluid from a cooling fluid supply source towards the first cooling hole. Moreover, the method includes expelling the cooling fluid from the first cooling hole into the cavity.

DETAILED DESCRIPTION

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about the longitudinal axis of the gas turbine engine.

In the following specification and the claims, reference will be made to a number of terms, which shall be defined to have the following meanings. The singular forms "a", "an", and "the" include plural references unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
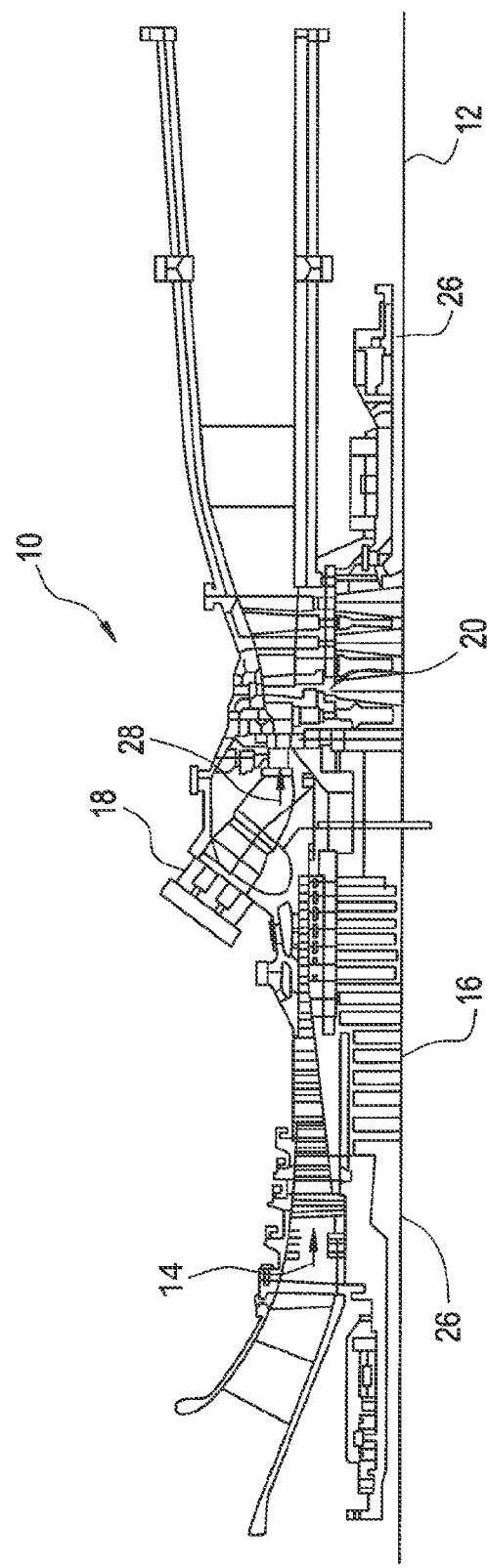
FIG. 1 is a schematic view of an exemplary gas turbine engine.

FIG. 1 is a schematic view of an exemplary gas turbine engine 10. While FIG. 1 illustrates an exemplary gas turbine engine, it should be noted that the turbine rotor wheel cooling systems and methods described herein are not limited to any particular type of turbine engine. One of ordinary skill in the art should appreciate that the turbine rotor wheel systems and methods described herein may be used with any rotary machine, including a compressor or a steam turbine, in any suitable configuration that enables such an apparatus, system, and method to operate as further described herein.

In the exemplary embodiment, gas turbine engine 10 has an engine centerline 12, and includes, in a serial flow relationship, a compressor 16, a combustor 18, and a high-pressure turbine 20. Combustor 18 and high-pressure turbine 20 are often referred to as the hot section of gas turbine engine 10. A rotor shaft 26 rotationally couples high-pressure turbine 20 to compressor 16. Compressor 16 pressurizes air 14, which is channeled to combustor 18 and various other areas within turbine engine 10. Fuel is burned in combustor 18 to produce a hot gas flow 28. Hot gas flow 28 is expanded through high-pressure turbine 20 wherein work is extracted from hot gas flow 28 to rotate compressor 16.

Figure 2:
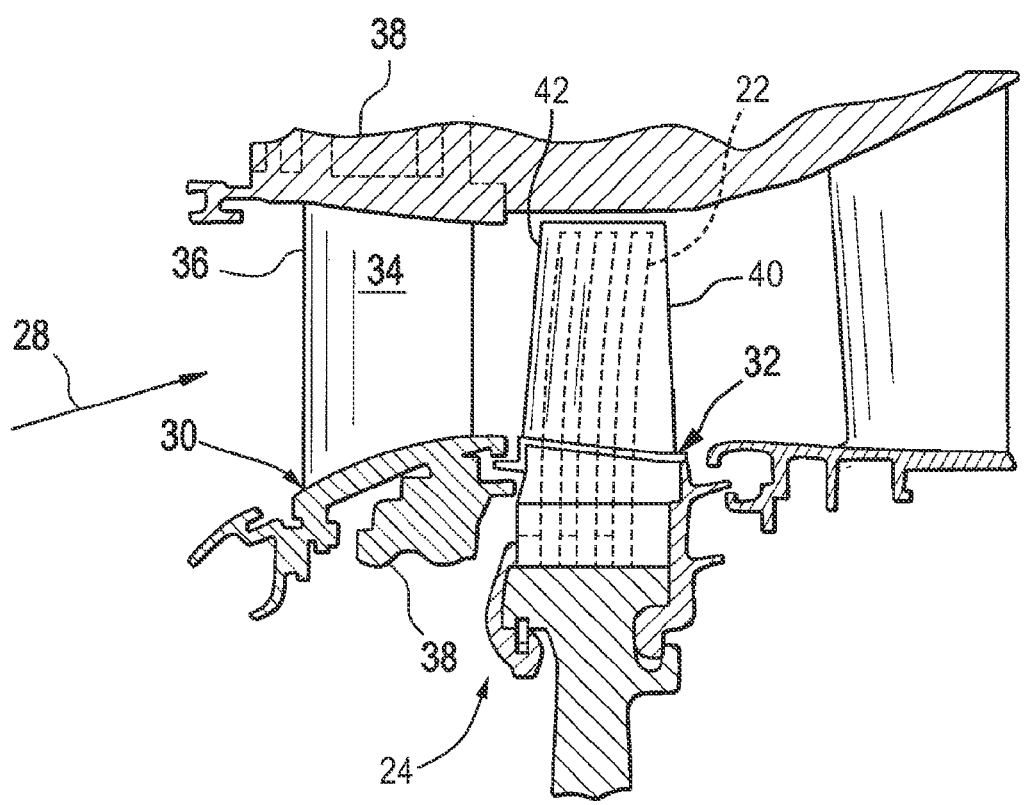
FIG. 2 illustrates a portion of a high-pressure turbine used with the gas turbine engine shown in FIG. 1.

FIG. 2 illustrates a portion of high-pressure turbine 20. In the exemplary embodiment, high-pressure turbine 20 includes a stator vane 30 and a turbine blade 32. An airfoil 34 used with stator vane 30 includes a leading edge 36 that is directly exposed to hot gas flow 28. Stator vanes 30 may be cooled by air routed from one or more stages of compressor 16 through a casing 38 of gas turbine engine 10. An airfoil 40 used with turbine blade 32 includes a leading edge 42 that is directly exposed to hot gas flow 28, and an axially opposite trailing edge 43. Turbine blades 32 may also be cooled by air 14 routed from one or more stages of compressor 16 through a casing 38 of gas turbine engine 10.

In the exemplary embodiment, air 14 is described as the cooling fluid used to cool the components exposed to combustion gases, e.g., stator vanes 30 and turbine blades 32. In alternative embodiments a fluid other than air 14 may be used to cool components exposed to combustion gases. It should also be appreciated that the term "fluid" as used herein includes any medium or material that flows, including, but not limited to, gas, steam, and air. In the exemplary embodiment, at least one cooling passage 22 defined in turbine blade 32 is coupled in flow communication with a cooling fluid supply source conduit 24. In the exemplary embodiment, fluid supply source conduit 24 is connected to compressor 16.

In operation, gas turbine engine 10 ingests air 14 into compressor 16. Compressor 16, rotating at a high rotational speed compresses or pressurizes air 14 and channels a portion of air 14 to combustor 18 and a portion of air 14 to other areas of gas turbine engine 10 for use in cooling components exposed to heat generated by gas turbine engine 10. Air 14 is mixed with fuel in combustor 18 and ignited to generate a hot gas flow 28. Hot gas flow 28 is channeled from combustor 16 towards high-pressure turbine 20 wherein the hot gas flow 28 passes through stator vanes 30 and impacts turbine blades 32 connected to rotor wheel 44. Rotor wheel 44 is rotated by hot gas flow 28 impacting turbine blades 32. Hot gas flow 28 also transfers heat to stator vanes 30 and turbine blades 32. A portion of air 14 is channeled through cooling passages 22 formed in stator vanes 30 and turbine blades 32 to facilitate cooling the components.

Figure 3:
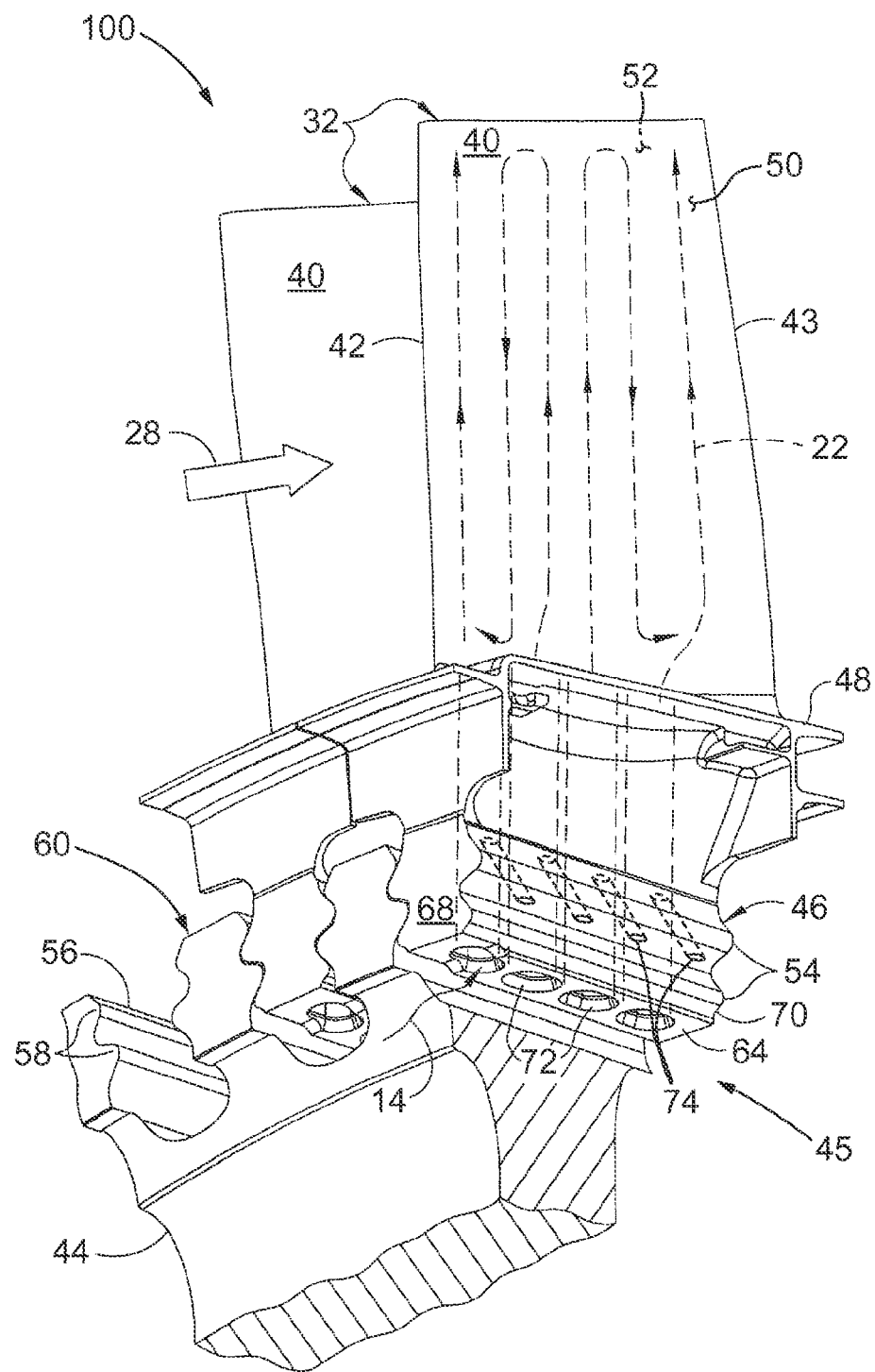
FIG. 3 is a partial isometric sectional view of the gas turbine engine shown in FIG. 1, and including an exemplary rotor wheel assembly.
Figure 4:
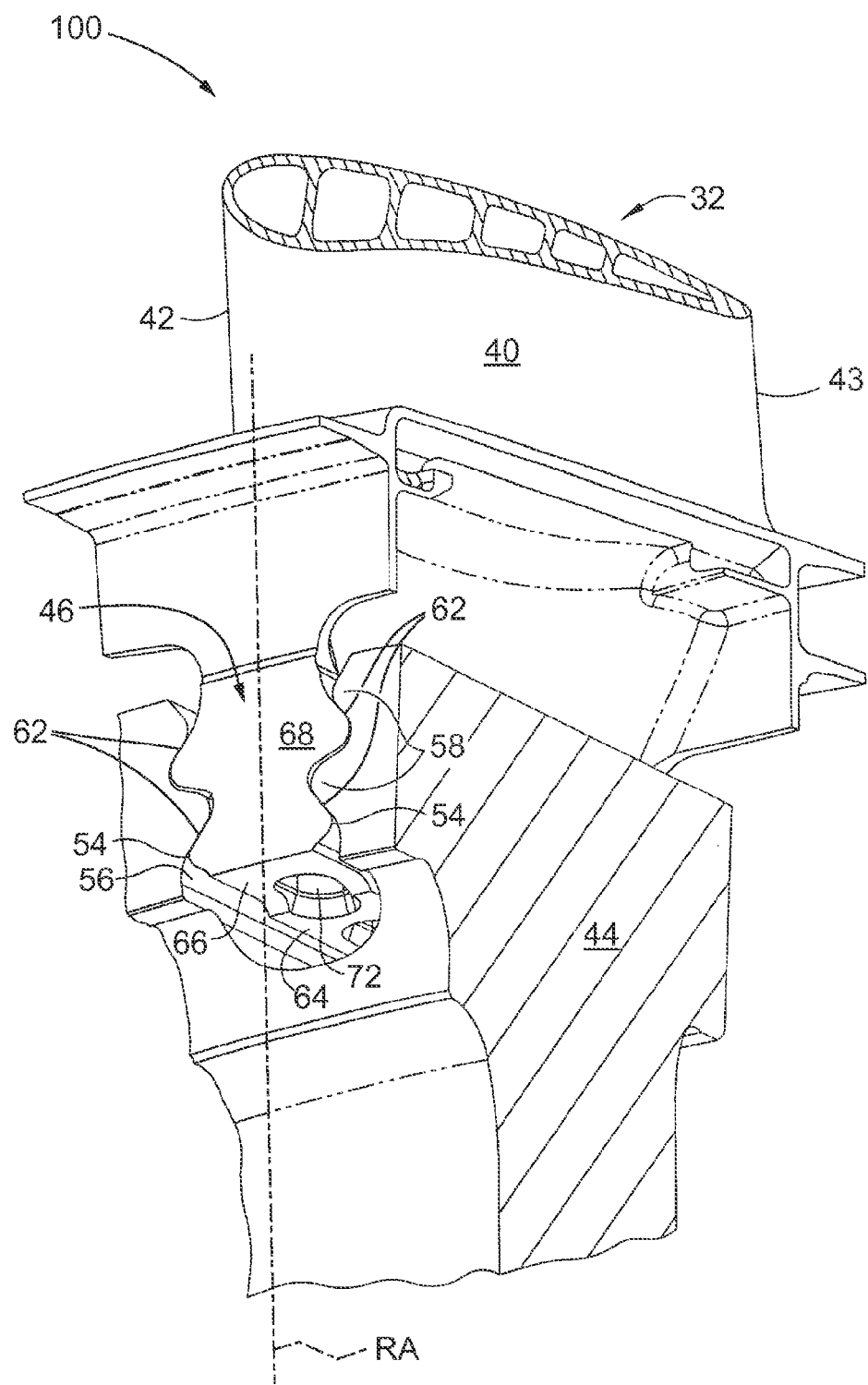
FIG. 4 is an enlarged view of a dovetail portion of the rotor wheel assembly shown in FIG. 3.

FIG. 3 is a partial isometric sectional view of gas turbine engine 10 illustrating an exemplary rotor wheel assembly 100. FIG. 4 is an enlarged view of a dovetail portion 45 of rotor wheel assembly 100 and includes a turbine blade 32 coupled to rotor wheel 44. In the exemplary embodiment, turbine blades 32 are coupled within high-pressure turbine 20. In alternative embodiments, a low-pressure turbine (not shown) may extract additional energy from hot gas flow 28 for powering a fan (not shown) positioned upstream from compressor 16, such as in a typical turbofan aircraft engine application.

In the exemplary embodiment, airfoil 40 is at least partially hollow and is integrally coupled to a dovetail 46 at a platform 48. Platform 48 defines a portion of a radially inner boundary for hot gas flow 28 within gas turbine engine 10. Airfoil 40 generally includes a concave pressure side 50 extending between leading edge 42 and trailing edge 43, and an opposite, convex, suction side 52. Dovetail 46 includes an upper pair of laterally or circumferentially opposite dovetail tangs 54 and a lower pair of dovetail tangs 54 that are configured in a typical fir tree arrangement. Dovetail tangs 54 support turbine blade 32 in a dovetail slot 56 formed in the perimeter of rotor wheel 44. Turbine blades 32 can be securely coupled to rotor wheel 44 as a dovetail 46 of a respective turbine blade 32 is inserted into a respective dovetail slot 56. When assembled, turbine blades 32 form an array of blades 32 that extend circumferentially about the outer periphery of rotor wheel 44. In the exemplary embodiment, each dovetail slot 56 is defined between each pair of circumferentially-spaced rotor wheel posts 60. Dovetail slot 56 includes slot tangs 58 that mate complementarily with turbine blade tangs 54 to provide pressure contact surfaces 62, through which at least centrifugal loads of turbine blades 32 are induced into rotor wheel 44.

Referring to FIG. 4, dovetail tangs 54 are symmetrically spread about a radial axis RA of turbine blade 32, wherein radial axis RA extends radially outward from engine centerline 12 of gas turbine engine 10. Centrifugal loads generated by turbine blade 32 during rotation of rotor wheel 44 in gas turbine engine 10 are transmitted through dovetail tangs 54 into slot tangs 58 of each dovetail slot 56. Accordingly, the pairs of dovetail tangs 54 transmit the centrifugal loads induced into turbine blades 32 during operation of gas turbine engine 10 into rotor wheel 44.

Figure 5:
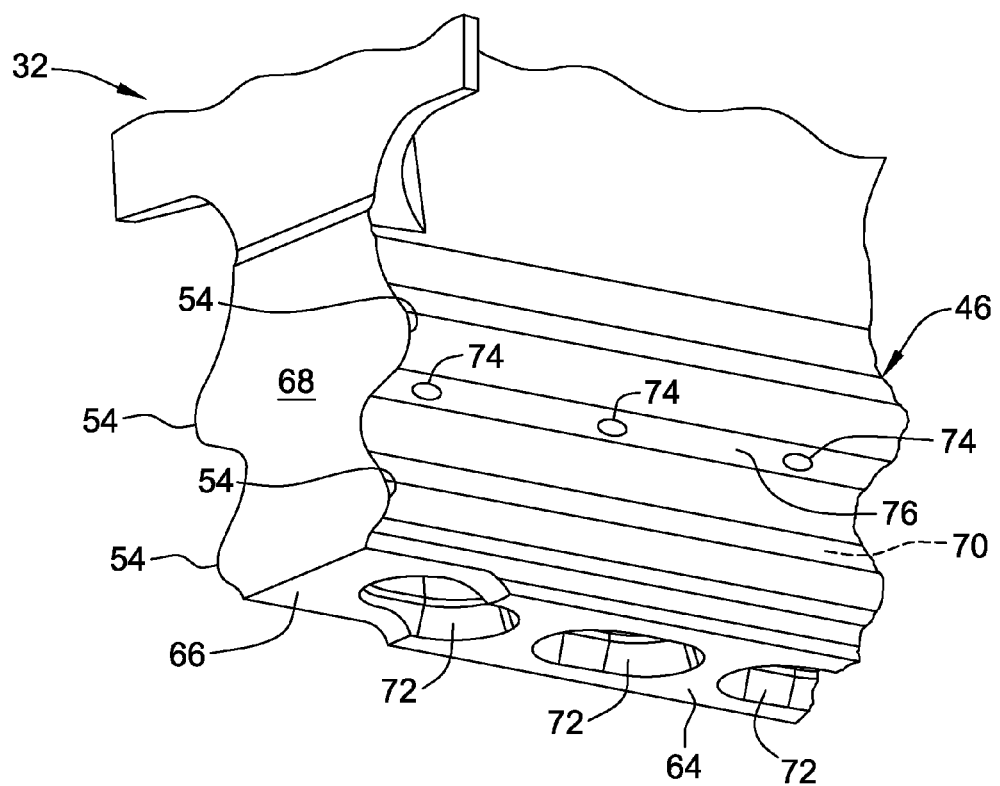
FIG. 5 is an enlarged isometric view of an exemplary turbine blade dovetail that may be used with the rotor wheel assembly shown in FIG. 3.

FIG. 5 is an enlarged isometric view of turbine blade dovetail 46. In the exemplary embodiment, dovetail 46 includes an integral root portion 64 that extends circumferentially between lower dovetail tangs 54. Root portion 64 is an integral extension of lower dovetail tangs 54 and is radially inward of and below tangs 54. Turbine blade 32 may be fabricated integrally, for example, by casting of a suitable superalloy capable of withstanding the temperatures and stresses generated within high-pressure turbine 20. In the exemplary embodiment, root portion 64 includes a notch 66 defined adjacent to a forward end wall 68 of dovetail 46. Alternatively, root portion 64 may extend from forward end wall 68 to an opposite aft end wall 70, may include a lip (not shown) that extends radially inward at forward end wall 68, or may be formed in any shape that enables gas turbine engine 10 to operate as described herein. In the exemplary embodiment, root portion 64 facilitates enhancing the structural integrity and strength of dovetail 46.

In the exemplary embodiment, airfoil 40 is a least partially hollow and includes internal cooling passages 22. Cooling passages 22 may include, for example, without limitation, drilled holes, serpentine-shaped passages lined with rib turbulators, and pin-fin and/or dimple cooling regions located within airfoil 20. In the exemplary embodiment, dovetail 46 includes a plurality of axially-aligned inlet apertures 72 that extend longitudinally through dovetail 46 and that are coupled in flow communication with cooling passages 22 formed in airfoil 40. Air 14 bled from compressor 16 is channeled through dovetail slots 56 and into inlet apertures 72 to provide air 14 through dovetail 46 and into airfoil 40.

Figure 6:
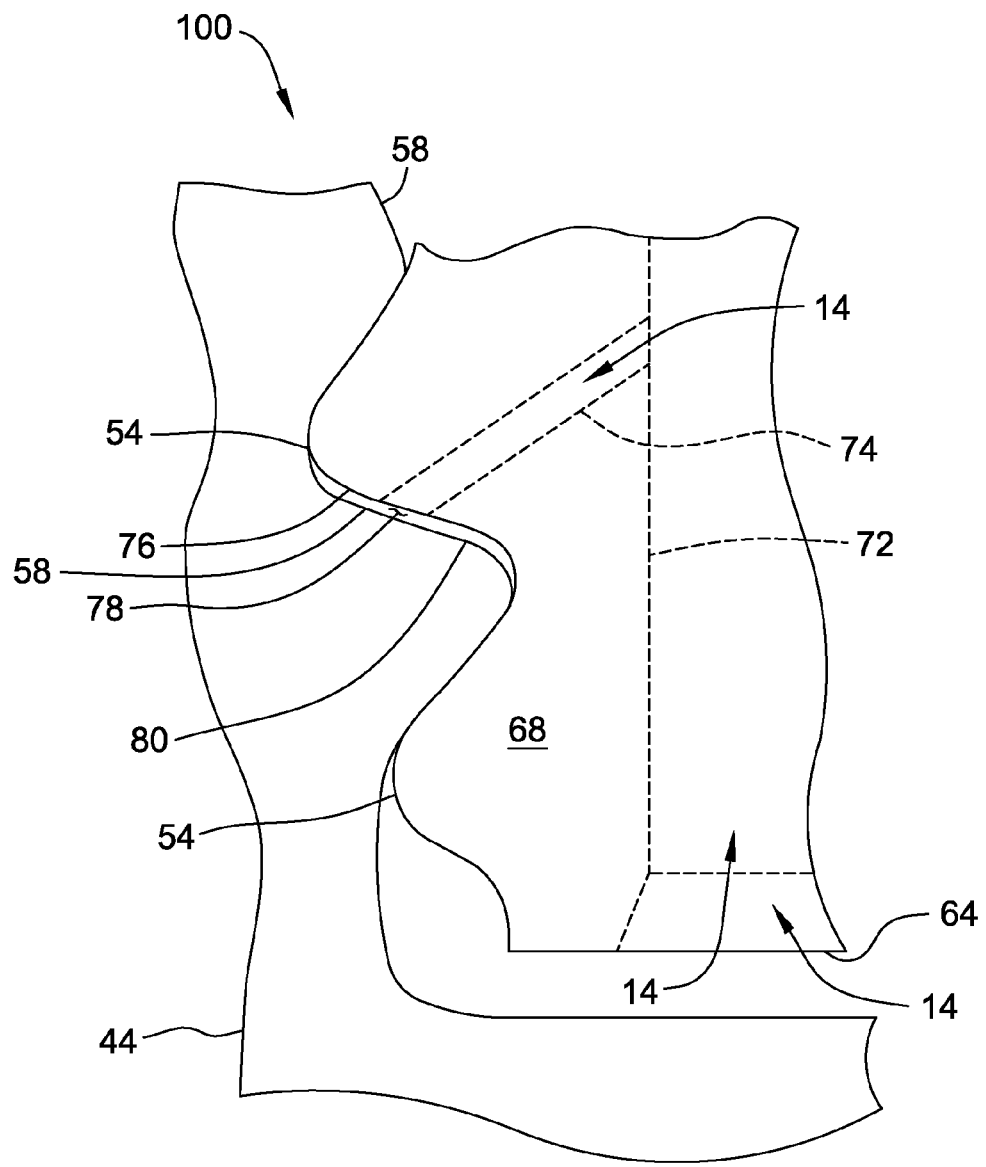
FIG. 6 is a front view of a portion of the rotor wheel assembly shown in FIG. 3.

FIG. 6 is a front view of a portion of rotor wheel assembly 100 and illustrates a cavity 78 formed between upper tangs 54 and slot tangs 58. In the exemplary embodiment, dovetail 46 also includes a plurality of dovetail cooling holes 74 that extend through upper tangs 54 and are coupled in flow communication with inlet apertures 72 and/or cooling passages 22. Air 14 bled from the compressor 16 is channeled through dovetail slots 56 into inlet apertures 72, prior to a portion being discharged through dovetail cooling holes 74 to provide air 14 to slot tangs 58 during operation of gas turbine engine 10 (shown in FIG. 1). In the exemplary embodiment, each dovetail cooling hole 74 extends from a lower surface 76 of upper tangs 54 to a respective inlet aperture 72. Alternatively, at least one cooling hole 74 may extend to an inlet aperture 72 and/or at least one cooling hole 74 may extend to a cooling passage 22. Cooling holes 74 be spaced axially along lower surface 76 of upper tangs 54. Each cooling hole 74 may have a smaller cross-sectional flow area than that defined in each inlet aperture 72. In the exemplary embodiment, cooling holes 74 are straight cylindrical passages. Alternatively, cooling holes 74 may be formed in any configuration that enables cooling holes 74 to operate as described herein.

In the exemplary embodiment, cooling holes 74 may be configured such that, during operation of gas turbine engine 10, each cooling hole 74 expels a desired impinged flow of air 14 into a cavity 78 formed between turbine blade 32 and rotor wheel 44 as rotor wheel 44 is moved to a radially-outward position due to centrifugal force generated during the rotating of rotor wheel assembly 100 at operating speed. Specifically, cooling holes 74 may be oriented such that the expelled air 14 is impinged with a relatively high velocity against an upper surface 80 of slot tang 58 of rotor wheel 44, thus increasing the cooling effectiveness of air 14. It should be appreciated that cavity 78 and tangs 54 and 58 that define them are generally difficult areas of dovetail slot 56 to cool, and that cooling holes 74 configured in this manner facilitates providing cooling to these areas. In one embodiment, the expelled air 14 may exit cavity 78 at the aft end wall 70 of dovetail 46. The air 14 may exit cavity 78 proximate end wall 70, for example, without limitation, through an unsealed gap (not shown), through a sealed gap with a known leakage area (not shown), or through a hole of predetermined size in a seal or dovetail tab (not shown).

In an alternative embodiment, cooling holes 74 may be configured such that, during operation of gas turbine engine 10, at least one cooling hole 74 expels an impinged flow of air 14 into cavity 78, and at least one cooling hole 74 may be alternatively configured to channel air 14 away from cavity 78 to at least one inlet aperture 72 and/or cooling passage 22. The advantage of such an embodiment is that air 14 may be reused to further cool other regions of turbine blade 32. Although air 14 expelled from cooling hole 74 is heated during the process of cooling rotor wheel 44, air 14 may be used to provide further cooling to turbine blade 32 because there are regions within turbine blade 32 that are not as sensitive to the temperature of air 14. Such regions may require a given amount of flow, thus, air 14 can be repurposed and channeled back into turbine blade 32 after being used to cool rotor wheel 44.

The systems and methods described herein facilitate reducing the number of hardware components necessary to provide cooling to the rotor wheel of a gas turbine engine by providing a cooling system that channels cooling air between the turbine blade tangs and the complementary dovetail slot tangs. Specifically, a dovetail of a turbine blade with a unique cooling system is described. The turbine blade dovetail includes a plurality of cooling hole that extend through the upper pair of tangs into the cooling fluid inlet apertures of the dovetail. Therefore, in contrast to known gas turbine engines that use typical cover plate assemblies and systems to channel cooling air to the rotor wheel, the apparatus, systems, and methods described herein facilitate improving rotor wheel cooling by channeling cooling air directly to the surface of the rotor wheel tangs, reducing the number of hardware components needed in a rotor wheel cooling system, and reducing the space requirements of the cooling system.

Exemplary embodiments of a method and a system for providing cooling of turbine components are described above in detail. The method and system are not limited to the specific embodiments described herein, but rather, components of systems and/or steps of the methods may be utilized independently and separately from other components and/or steps described herein. For example, the method may also be used in combination with other turbine components, and are not limited to practice only with the gas turbine blades as described herein. Rather, the exemplary embodiment can be implemented and utilized in connection with many other gas turbine applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the systems and methods described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the disclosure has been described in terms of various specific embodiments, those skilled in the art will recognize that the disclosure can be practiced with modification within the spirit and scope of the claims.

What is claimed is:

1. A rotor wheel assembly comprising:
a rotor wheel comprising a plurality of dovetail slots spaced circumferentially about a peripheral surface of said rotor wheel, each said dovetail slot comprising a pair of opposite upper slot tangs and a pair of opposite lower slot tangs, each said dovetail slot defines a circumferential depth between a first of said pair of upper slot tangs and a first of said pair of lower slot tangs at a farthest point of said dovetail slot from a longitudinal centerline of said dovetail slot, each of said lower slot tangs comprising an upper surface; and
at least one turbine blade comprising an airfoil, a platform, and a dovetail, said dovetail comprising a pair of opposite upper dovetail tangs and a pair of opposite lower dovetail tangs, at least one of said upper dovetail tangs comprising a lowest surface that extends fully to said circumferential depth between said first upper slot tang and said first lower slot tang of a corresponding said dovetail slot, wherein a cavity is defined and extends radially between said lowest surface and said upper surface during rotation of said rotor wheel, said dovetail further comprising at least one inlet aperture extending longitudinally therethrough, said at least one upper dovetail tang comprising a first cooling hole extending through said lowest surface of said upper dovetail tang and coupled in flow communication between said at least one inlet aperture and said cavity.

2. The system in accordance with claim 1, wherein said pair of opposite upper dovetail tangs are symmetrically oriented and are shaped complementary to said pair of upper slot tangs, and wherein said pair of opposite lower dovetail tangs are symmetrically oriented and are shaped complementary to said pair of lower slot tangs to support said turbine blade in one of said plurality of dovetail slots.

3. The system in accordance with claim 1, wherein said first cooling hole is configured to direct a cooling fluid from said at least one inlet aperture towards said cavity such that the cooling fluid impinges upon said lower slot tang upper surface.

4. The system in accordance with claim 1, wherein said airfoil is at least partially hollow and comprises at least one cooling passage defined therein, said at least one cooling passage coupled in flow communication with said at least one inlet aperture.

5. The system in accordance with claim 4, wherein said at least one upper dovetail tang further comprises a second cooling hole extending through said lowest surface and coupled in flow communication between said at least one cooling passage and said cavity.

6. The system in accordance with claim 5, wherein said first cooling hole is configured to direct a cooling fluid from said at least one inlet aperture towards said cavity, and wherein said second cooling hole is configured to direct the cooling fluid from said cavity towards said at least one cooling passage.

7. A turbine engine comprising:
a rotatable shaft having an axis of rotation;
a casing extending circumferentially about said rotatable shaft, said casing comprising at least one conduit configured to channel a cooling fluid; and
a rotor wheel assembly coupled to a portion of said rotatable shaft for rotation therewith, said rotor wheel assembly configured to expand a working fluid of said turbine engine, said rotor wheel assembly comprising:
a rotor wheel comprising a plurality of dovetail slots spaced circumferentially about a periphery of said rotor wheel, each said dovetail slot comprising a pair of opposite upper slot tangs and a pair of opposite lower slot tangs, each said dovetail slot defines a circumferential depth between a first of said pair of upper slot tangs and a first of said pair of lower slot tangs at a farthest point of said dovetail slot from a longitudinal centerline of said dovetail slot, each of said lower slot tangs comprising an upper surface; and
a plurality of turbine blades arranged in a circumferential array about said axis of rotation, each respective turbine blade of said plurality of turbine blades comprising an airfoil, a platform, and a dovetail, said dovetail comprising a pair of opposite upper dovetail tangs and a pair of opposite lower dovetail tangs, at least one of said upper dovetail tangs comprising a lowest surface that extends fully to said circumferential depth between said first upper slot tang and said first lower slot tang of a corresponding said dovetail slot, wherein a cavity is defined and extends radially between said lowest surface and said upper surface during rotation of said rotor wheel, said dovetail further comprising at least one inlet aperture extending longitudinally therethrough and coupled to said at least one conduit, said at least one upper dovetail tang comprising a first cooling hole extending through said lowest surface and coupled in flow communication between said at least one inlet aperture and said cavity.

8. A turbine engine in accordance with claim 7, wherein said pair of upper dovetail tangs are symmetrically oriented and are shaped complementary to said pair of upper slot tangs, and wherein said pair of opposite lower dovetail tangs are symmetrically oriented and are shaped complementary to and said pair of lower slot tangs to provide pressure contact surfaces therebetween, through which centrifugal loads applied to said plurality of turbine blades are transmitted to said rotor wheel.

9. A turbine engine in accordance with claim 7, wherein said at least one inlet aperture comprises a plurality of inlet apertures.

10. A turbine engine in accordance with claim 9, wherein said airfoil is at least partially hollow and comprises a plurality of cooling passages defined therein, wherein said plurality of cooling passages are coupled in flow communication with said plurality of axially-aligned inlet apertures.

11. A turbine engine in accordance with claim 10, wherein said at least one upper dovetail tang further comprise a second cooling hole extending through said lowest surface and coupled in flow communication between at least one of said plurality of cooling passages and said cavity.

12. A turbine engine in accordance with claim 11, wherein said first cooling hole is configured to direct the cooling fluid from at least one of said plurality of axially-aligned inlet apertures towards said cavity, and wherein said second cooling hole is configured to direct the cooling fluid from said cavity towards at least one of said plurality of cooling passages.

13. A turbine engine in accordance with claim 7, wherein said first cooling hole is configured to direct a cooling fluid from said at least one inlet aperture towards said cavity such that the cooling fluid impinges upon said lower slot tang upper surface.

14. A method of making a rotor wheel assembly including a plurality of turbine blades and a rotor wheel including a plurality of dovetails slots spaced circumferentially about a periphery of the rotor wheel, each of the dovetail slots defined by an upper slot tang and a lower slot tang, each dovetail slot defines a circumferential depth between the upper slot tang and the lower slot tang at a farthest point of the dovetail slot from a longitudinal centerline of the dovetail slot, wherein each turbine blade of the plurality of turbine blades includes an airfoil including at least one cooling passage, a platform, and a dovetail, the dovetail including an upper dovetail tang, a lower dovetail tang, and at least one inlet aperture coupled in flow communication with the at least one cooling passage, said method comprising:

forming, in at least one of the plurality of turbine blades, a first cooling hole through a lowest surface of the upper dovetail tang, the first cooling hole in flow communication with the at least one inlet aperture; and coupling the at least one turbine blade to a corresponding one of the dovetail slots such that the lowest surface extends fully to the circumferential depth between the upper slot tang and the lower slot tang of the corresponding dovetail slot, and such that a cavity is defined and extends radially between the lowest surface of the upper dovetail tang and an upper surface of the lower slot tang during rotation of the rotor wheel, wherein the first cooling hole defines a flow path from the least one inlet aperture to the cavity.

15. The method in accordance with claim 14 further comprising forming a second cooling hole through the lowest surface of the upper tang of the turbine blade dovetail and in flow communication with the at least one cooling passage.

16. The method in accordance with claim 15 further comprising forming the second cooling hole and such that a flow path is defined from the at least one aperture, through the first cooling hole, the cavity, and the second cooling hole, and into the at least one cooling passage.

17. The method in accordance with claim 14, wherein the upper tang of the turbine blade dovetail is one of a pair of opposite upper dovetail tangs, and forming the first cooling hole comprises forming one of a pair of first cooling holes through the lowest surface of each of the respective upper dovetail tangs.

18. The method in accordance with claim 14, wherein forming the first cooling hole comprises forming the first cooling hole configured to direct a cooling fluid from the at least one inlet aperture towards the cavity such that the cooling fluid impinges upon the lower slot tang upper surface.

19. The system in accordance with claim 1, wherein said dovetail slot is configured to couple directly against a complimentary said dovetail tang upper surface to the full circumferential depth, such that said cavity extends between said dovetail tang lowest surface and said slot tang upper surface to the full circumferential depth.

20. The system in accordance with claim 1, wherein said cooling hole is positioned within said dovetail tang such that a cooling fluid is impinged directly onto said slot tang upper surface at a location circumferentially inward of the circumferential depth.

* * * * *